US008730919B2

(12) United States Patent
Jung et al.

(10) Patent No.: US 8,730,919 B2
(45) Date of Patent: May 20, 2014

(54) METHOD FOR PERFORMING MOBILITY IN WIRELESS COMMUNICATION SYSTEM AND APPARATUS FOR THE SAME

(71) Applicants: Sung Hoon Jung, Anyang-si (KR); Sung Jun Park, Anyang-si (KR); Jae Wook Lee, Anyang-si (KR); Young Dae Lee, Anyang-si (KR); Seung June Yi, Anyang-si (KR)

(72) Inventors: Sung Hoon Jung, Anyang-si (KR); Sung Jun Park, Anyang-si (KR); Jae Wook Lee, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 13/625,594

(22) Filed: Sep. 24, 2012

(65) Prior Publication Data

US 2013/0077515 A1   Mar. 28, 2013

Related U.S. Application Data

(60) Provisional application No. 61/538,933, filed on Sep. 25, 2011.

(51) Int. Cl.
*H04B 7/212* (2006.01)

(52) U.S. Cl.
USPC .......................................................... 370/331

(58) Field of Classification Search
CPC combination set(s) only.
See application file for complete search history.

(56) References Cited

U.S. PATENT DOCUMENTS

| 7,957,743 | B2* | 6/2011 | Moe et al. | 455/439 |
| 8,254,982 | B2* | 8/2012 | Kuningas | 455/525 |
| 8,285,290 | B2* | 10/2012 | Arora et al. | 455/438 |
| 8,634,380 | B2* | 1/2014 | Serravalle | 370/331 |
| 2010/0297955 | A1* | 11/2010 | Marinier et al. | 455/73 |

* cited by examiner

*Primary Examiner* — Fan Ng
(74) *Attorney, Agent, or Firm* — McKenna Long & Aldridge LLP

(57) ABSTRACT

A method for performing mobility by a user equipment (UE) in a wireless communication system is provided. The method includes: receiving Physical layer Cell Identity (PCI) split information from a network, the PCI split information indicating a predetermined set of at least one PCI reserved for a predetermined cell type; receiving system information from at least one candidate cell, the system information comprising a PCI for each cell; measuring the at least one candidate cell; determining whether to apply the PCI split information for selecting a target cell; selecting the target cell; and performing the mobility to the target cell. If it is determined that the PCI split information is applied, the step of selecting the target cell includes: excluding at least one cell has a PCI included in the predetermined set; and selecting the target cell among at least one remaining cell.

20 Claims, 17 Drawing Sheets

METHOD FOR PERFORMING MOBILITY IN WIRELESS COMMUNICATION SYSTEM AND APPARATUS FOR THE SAME

CROSS-REFERENCE TO RELATED APPLICATIONS

This application claims the benefit of priority of U.S. Provisional application 61/538,933 filed on Sep. 25, 2011, which is incorporated by reference in their entirety herein.

BACKGROUND

1. Technical Field

The present invention relates to a wireless communication, and more particularly, to a method for performing mobility and an apparatus for the same.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A micro cell, a femto cell, and a pico cell, etc., having a small service area can be installed in a specific location of a macro cell having a wide coverage.

Due to mobility of a user equipment (UE) represented as a mobile device, quality of a currently provided service may deteriorate or a cell capable of providing a better service may be detected. Accordingly, the UE may move to a new cell, which is called performing of the mobility of the UE.

In order to perform the mobility, the UE persistently performs measurement on a serving cell and a neighboring cell. When the measurement result satisfies a condition for performing the mobility, the UE can receive an instruction from the serving cell and can directly perform the mobility.

There may be a cell which serves only a member UE allowed to access the cell. The cell may be referred as a Closed Subscriber Group (CSG) cell. In case that the target cell is the CSG cell, the UE checks whether itself is a member of the target cell in a mobility procedure. If only the UE is a member of the target cell, the UE can access to the corresponding cell.

In the above communication system, for supporting the mobility of the UE, cell identifying information may be provided, so as to make the UE distinguish a certain cell, i.e. a CSG cell, which allows a UE in a specific group. The cell identifying information may increase efficiency of the mobility performance of the UE, on the other hand may occur wrong mobility of the UE. Therefore, a method for efficiently and accurately performing the mobility in basis of the cell identifying information.

SUMMARY

The present invention provides a method for performing mobility in a wireless communication system and an apparatus for the same.

In an aspect, a method for performing mobility by a user equipment (UE) in a wireless communication system is provided. The method includes: receiving Physical layer Cell Identity (PCI) split information from a network, the PCI split information indicating a predetermined set of at least one PCI reserved for a predetermined cell type; receiving system information from at least one candidate cell, the system information comprising a PCI for each cell; measuring the at least one candidate cell; determining whether to apply the PCI split information for selecting a target cell; selecting the target cell; and performing the mobility to the target cell. If it is determined that the PCI split information is applied, the step of selecting the target cell includes: excluding at least one cell has a PCI included in the predetermined set; and selecting the target cell among at least one remaining cell.

Wherein if is determined that the PCI split information is not applied, the step of selecting the target cell may include selecting the target cell among the at least one candidate cell.

The method may further include receiving a PCI split invalidation indication from the network, the PCI invalidation indication indicating the PCI split information is not available. The step of determining whether to apply the PCI split information may include determining not to apply the PCI split information in response to the PCI split invalidation indication.

The method may further include discarding the PCI split information in response to the PCI split invalidation indication.

The method may further include: receiving a PCI split application area information from the network; and determining whether the PCI split information is available based on the PCI split application area information. It may be determined that the PCI split information is applied if the PCI split information is available.

The PCI split application area information may indicate a cell list indicating at least one cell in which the PCI split information is available. It may be determined that the PCI split information is available if the UE camps on the at least one cell indicated by the cell list.

The PCI split application area information may indicate a tracking area. It may be determined that the PCI split information is available if the UE camps on a cell included in the tracking area.

The PCI split application area information may indicate a geographical area. It may be determined that the PCI split information is available if the UE is located in the geographical area.

The PCI split application area information may indicate a public land mobile network (PLMN) list. It may be determined that the PCI split information is available if a registered PLMN (RPLMN) is included in the PLMN list.

The predetermined cell type may be a Closed Subscriber Group (CSG) cell type.

In another aspect, an apparatus operating in a wireless communication system is provided. The apparatus include: a radio frequency (RF) unit transmitting and receiving a radio signal; and a processor operably coupled to the RF unit. The processor is configured to: receive Physical layer Cell Identity (PCI) split information from a network, the PCI split information indicating a predetermined set of at least one PCI reserved for a predetermined cell type, receive system information from at least one candidate cell, the system information comprising a PCI for each cell, measure the at least one candidate cell, determine whether to apply the PCI split information for selecting a target cell, select the target cell, and perform the mobility to the target cell. If it is determined that the PCI split information is applied, the selecting the target cell includes: excluding at least one cell has a PCI included in the predetermined set; and selecting the target cell among at least one remaining cell.

DESCRIPTION OF EXEMPLARY EMBODIMENTS

Figure 1:
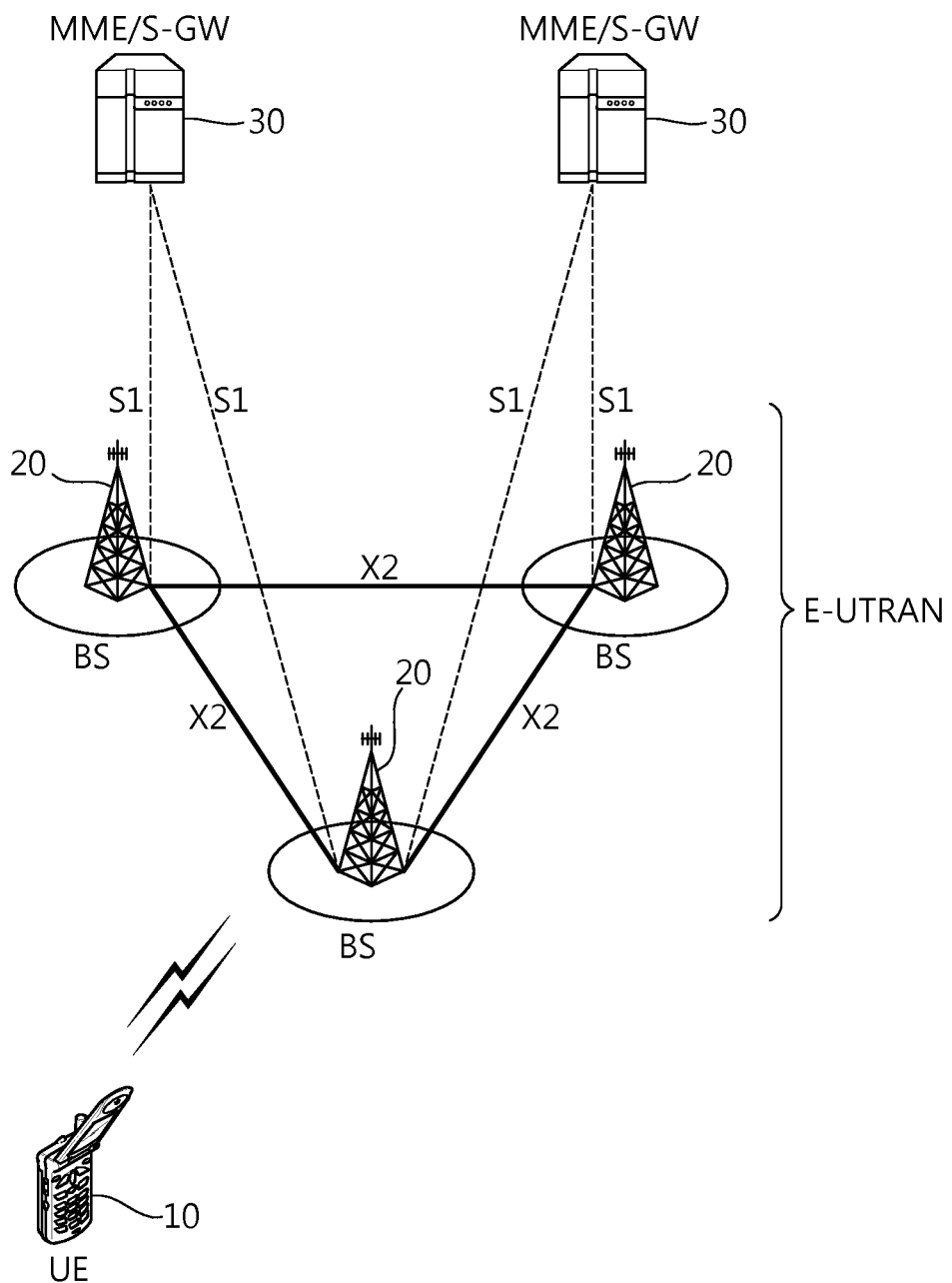
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
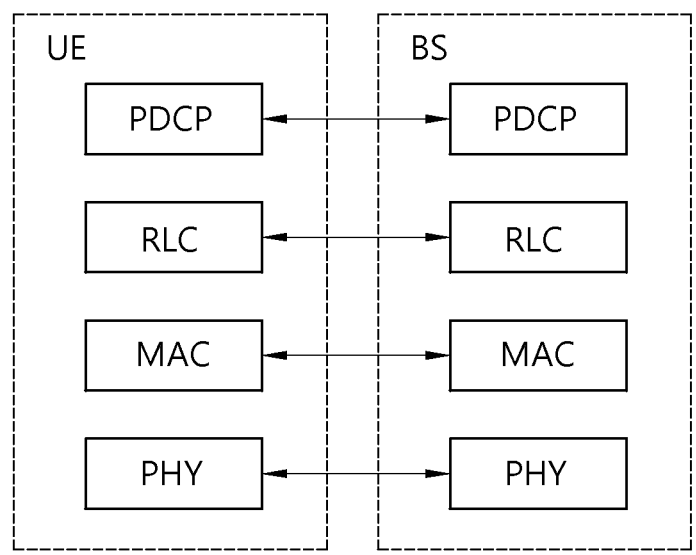
FIG. 2 is a diagram illustrating a radio protocol architecture for a user plane.
Figure 3:
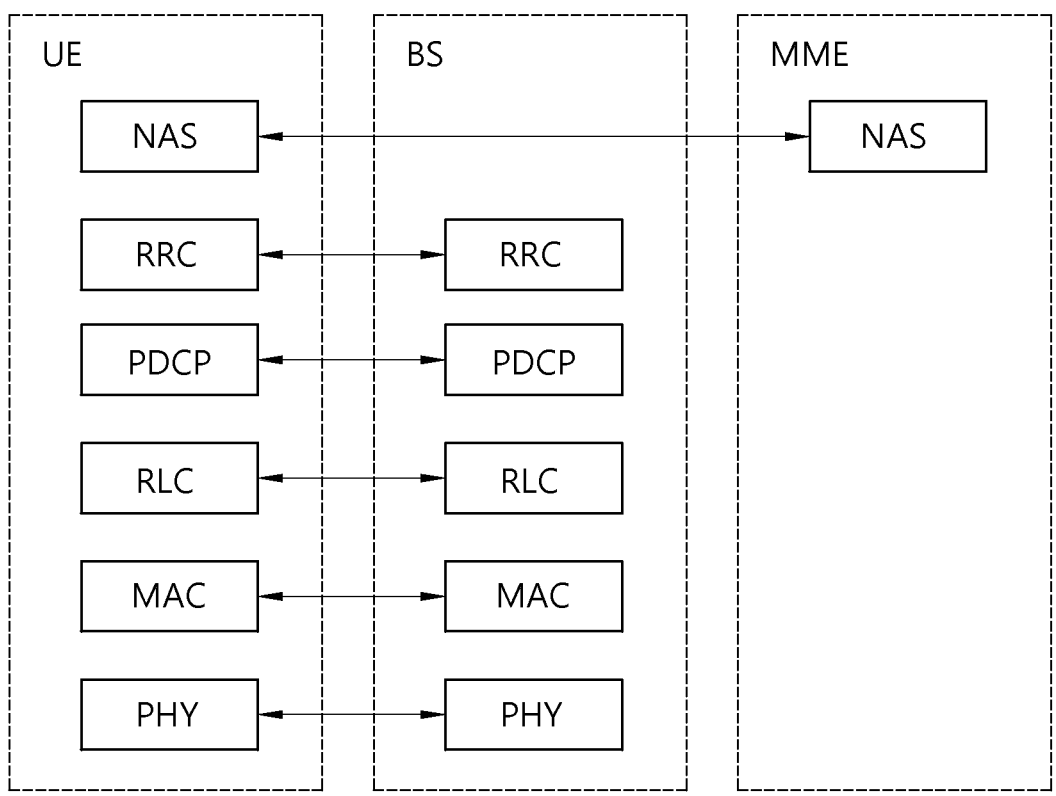
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
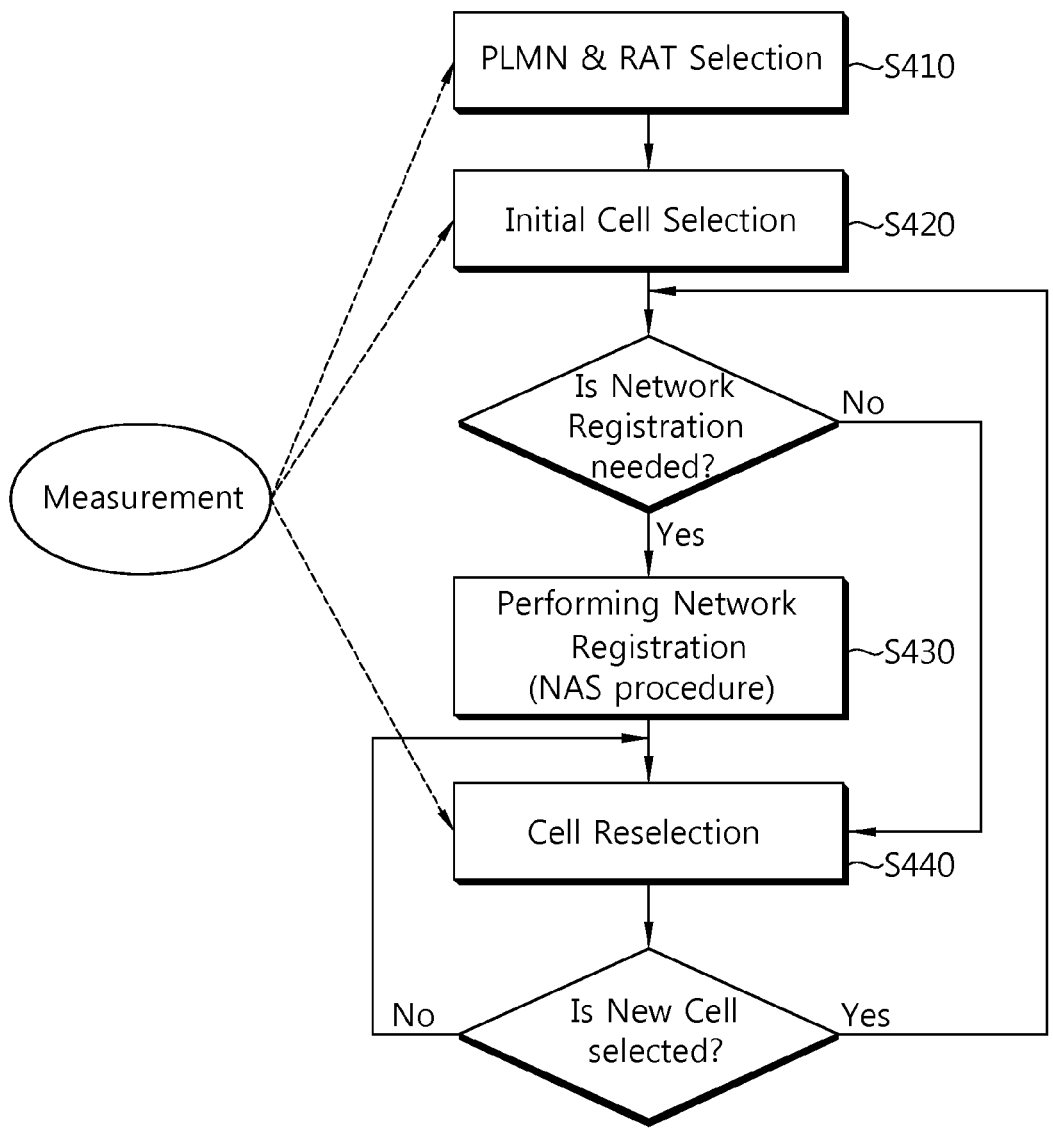
FIG. 4 is a flowchart showing an operation of a UE in RRC_IDLE state.

FIG. 4 is a flowchart showing an operation of a UE in RRC_IDLE state. It is illustrated in FIG. 4 that a procedure of registering a PLMN through a cell selection and performing a cell reselection if needed after the UE is initially turned on.

Referring the FIG. 4, the UE selects a RAT for communicating with a PLMN from which the UE intends to be served (step S410). Information about the PLMN and the RAT may be selected by a user of the UE. The user may use the information stored in a Universal Subscriber Identity Module (USIM).

A UE selects a highest cell among a measured BS and cells having higher quality than a predetermined value (step S420). This procedure is referred as an initial cell reselection, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed (step S430). The UE registers self information (i.e. IMSI) for being served by the network (i.e. paging). The UE does not register whenever the UE selects a cell. When the UE's own information about the network is different from information about the network provided from the system information, the UE performs the network registration procedure.

Figure 5:
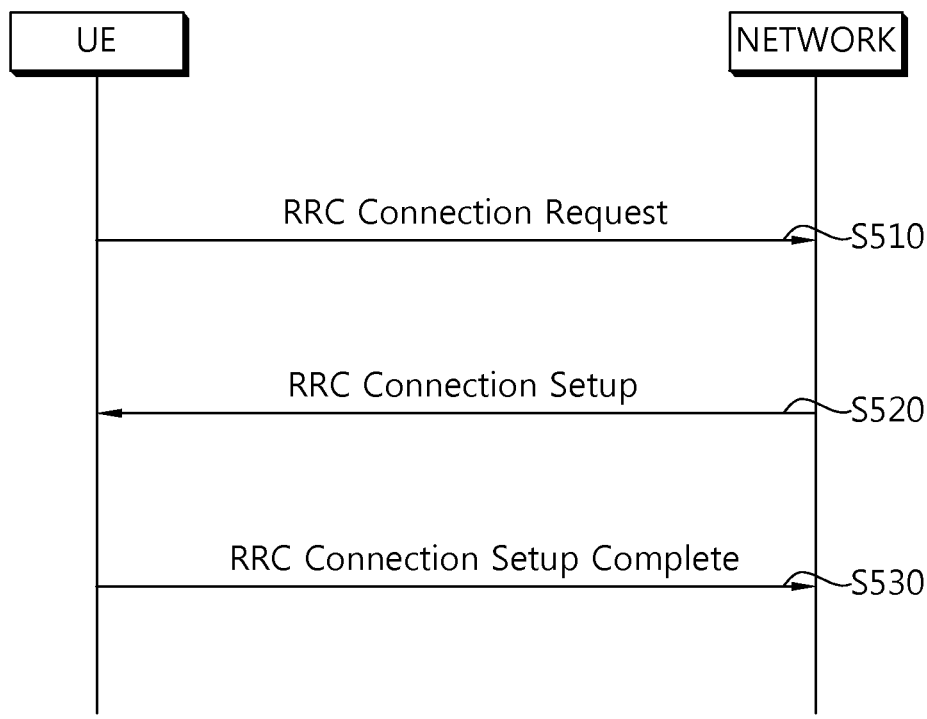
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 6:
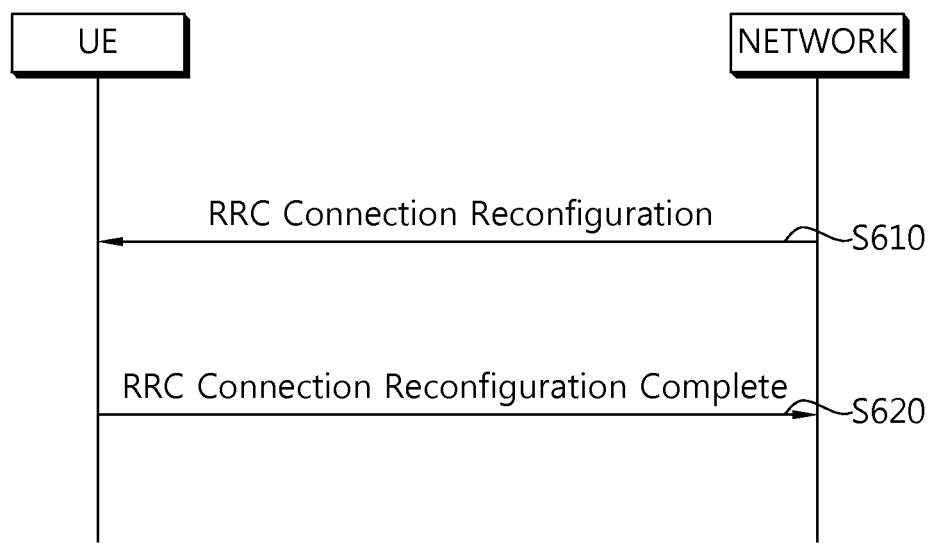
FIG. 6 is a flowchart showing an RRC connection reconfiguration procedure.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using a dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$Rs = Q_{meas,s} + Q_{hyst}, Rn = Q_{meas,n} - Q_{offset}$$ [Equation 1]

Herein, Rs denotes a ranking value of a serving cell, Rn denotes a ranking criterion of a neighboring cell, $Q_{meas,s}$ denotes a quality value measured for the serving cell by the UE, $Q_{meas,n}$ denotes a quality value measured for the neighboring cell by the UE, Qhyst denotes a hysteresis value for ranking, and Qoffset denotes an offset between two cells.

In the intra-frequency cell reselection, if the UE receives an offset $Q_{offsets,n}$ between the serving cell and the neighboring cell, $Q_{ffoset} = Q_{offsets,n}$. Otherwise, $Q_{ffoset} = 0$.

In the inter-frequency cell reselection, if the UE receives the offset $Q_{offsets,n}$, $Q_{offset} = Q_{offsets,n} + Q_{frequency}$. Otherwise, $Q_{offset} = Q_{frequency}$.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 7:
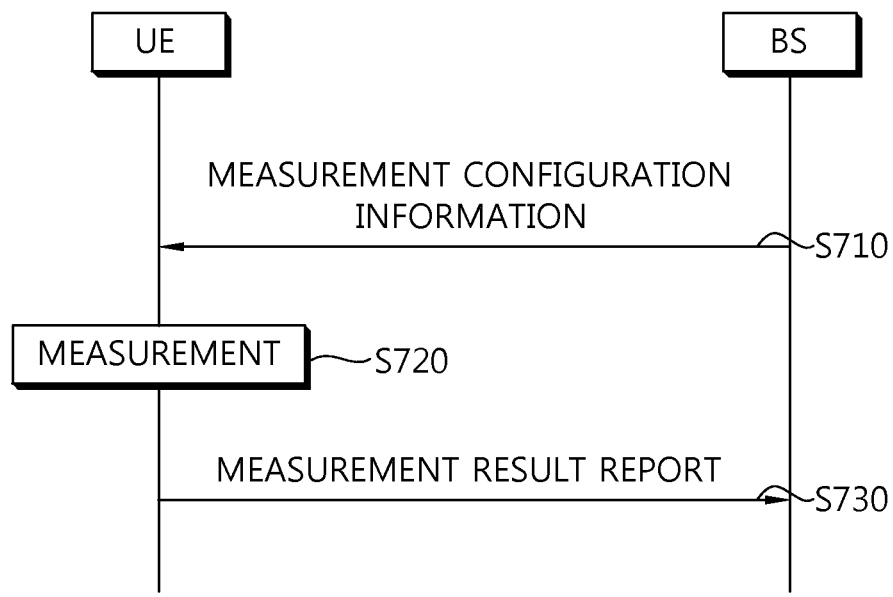
FIG. 7 is a flowchart showing a conventional method of performing measurement.

FIG. 7 is a flowchart showing a conventional method of performing measurement.

A UE receives measurement configuration information from a BS (step S710). A message including the measurement configuration information is referred to as a measurement configuration message. The UE performs measurement based on the measurement configuration information (step S720). If a measurement result satisfies a reporting condition included in the measurement configuration information, the UE reports the measurement result to the BS (step S730). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Event | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 8:
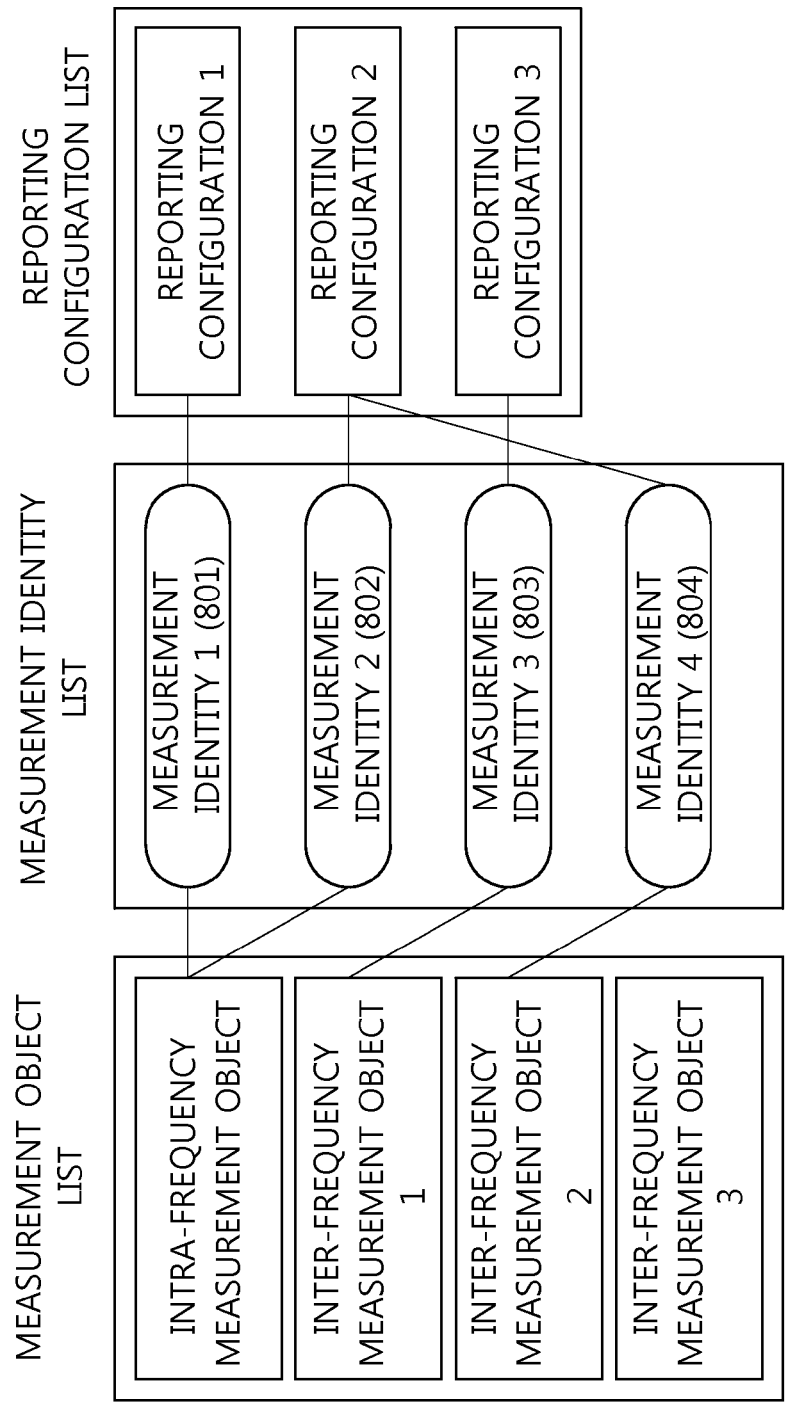
FIG. 8 shows an example of a measurement configuration assigned to a UE.

FIG. 8 shows an example of a measurement configuration assigned to a UE.

First, a measurement identity1 801 associates an intra-frequency measurement object with a reporting configuration 1. The UE performs intra-frequency measurement. The reporting configuration 1 is used to determine a reporting type and a criterion for reporting a measurement result.

A measurement identity2 802 is associated with the intra-frequency measurement object similarly to the measurement identifier1 801, and associates the intra-frequency measurement object with a reporting configuration 2. The UE performs intra-frequency measurement. The reporting configuration 2 is used to determine a reporting format and a criterion for reporting a measurement result.

By using the measurement identity1 801 and the measurement identity2 802, the UE transmits a measurement result even if the measurement result on the intra-frequency measurement object satisfies any one of the reporting configuration 1 and the reporting configuration 2.

A measurement identity3 803 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 804 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 9:
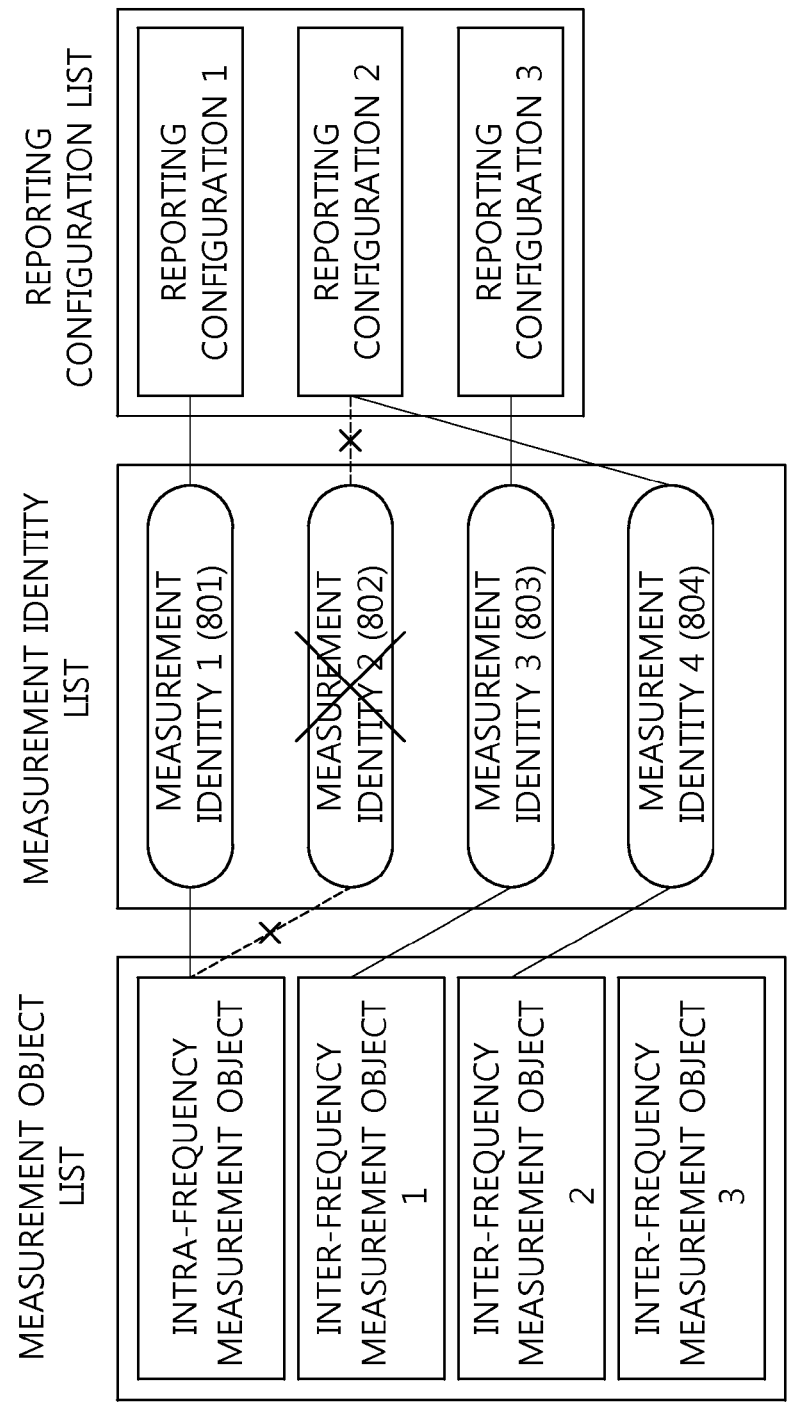
FIG. 9 shows an example of deleting a measurement identity.

FIG. 9 shows an example of deleting a measurement identity. When a measurement identity2 802 is deleted, measurement on a measurement object associated with the measurement identity2 802 is suspended, and a measurement report is not transmitted. A reporting configuration or a measurement object associated with the deleted measurement identity may not be modified.

Figure 10:
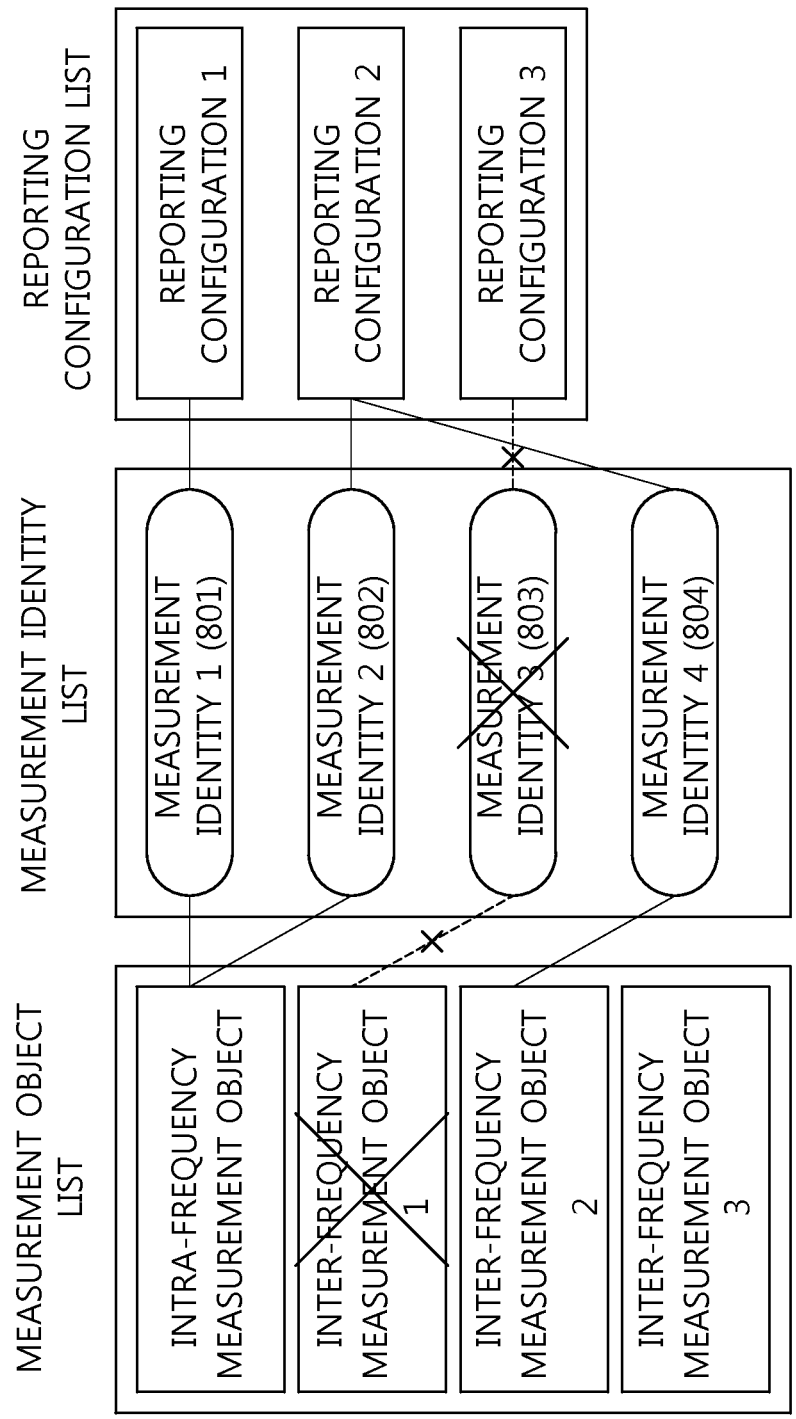
FIG. 10 shows an example of deleting a measurement object.

FIG. 10 shows an example of deleting a measurement object. When an inter-frequency measurement object 1 is deleted, a UE also deletes an associated measurement identifier3 803. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

A Public Land Mobile Network (PLMN) is a network deployed and operated by mobile network operator(s). Each mobile network operator runs one or more PLMNs. Each PLMN can be identified with the Mobile Country Code (MCC) and the Mobile Network Code (MNC). The PLMN information of a cell is broadcast in the system information.

For PLMN selection, cell selection, and cell reselection, several types of PLMNs are considered by UE.

Home PLMN (HPLMN): The PLMN whose MCC and the MNC matches the MCC and the MNC of the UE's IMSI.

Equivalent HPLMN (EHPLMN): Any PLMN that is equivalent to HPLMN.

Registered PLMN (RPLMN): The PLMN for which location registration is successful.

Equivalent PLMN (EPLMN): Any PLMN that is equivalent to RPLMN.

Each mobile service subscriber has a subscription with a HPLMN. When the normal service is provided to UE by the HPLMN or the EHPLMN, the UE is not in a roaming state. On the other hand, when the service is provided to UE by the PLMN other than HPLMN/EPHPLN, the UE is in a roaming state, and the PLMN is called Visited PLMN (VPLMN).

When UE is powered on, PLMN selection is triggered. For the selected PLMN, UE attempts to register the selected PLMN. If the registration is successful, the selected PLMN becomes RPLMN. Network can signal to the UE a list of PLMN for which the UE considers those PLMNs in the PLMN list equivalent to its RPLMN. The PLMN equivalent to RPLMN is called EPLMN. The UE that registered with network should be reachable by the network at any time. If the UE is in ECM-CONNECTED (equivalently RRC_CONNECTED), the network is aware of the cell the UE is being served. However, while the UE is in ECM-IDLE (equivalently RRC_IDLE), the context of the UE is not available at the eNB but stored in the MME. In this case, the location of the UE in ECM-IDLE is only known to the MME at the granularity of a list of Tracking Area (TA)s. A single TA is identified by the Tracking Area Identity (TAI) which consists of the PLMN Identity the tracking area belongs to and the Tracking Area Code (TAC) that uniquely represents the TA in the PLMN.

The following description is about an H(e)NB.

In addition to a mobile network vendor, a mobile communication service can be provided via an eNB of an individual user or a specific vendor or a group owner. Such an eNB is called a home node B (HNB) or a home eNB (HeNB). Hereinafter, both the HNB and HeNB are collectively referred to as the HeNB. The HeNB is basically used to provide specialized services only to members of a closed subscriber group (CSG). However, according to operation mode setting of the HeNB, the services may also be provided to other users in addition to the users of the CSG.

Figure 11:
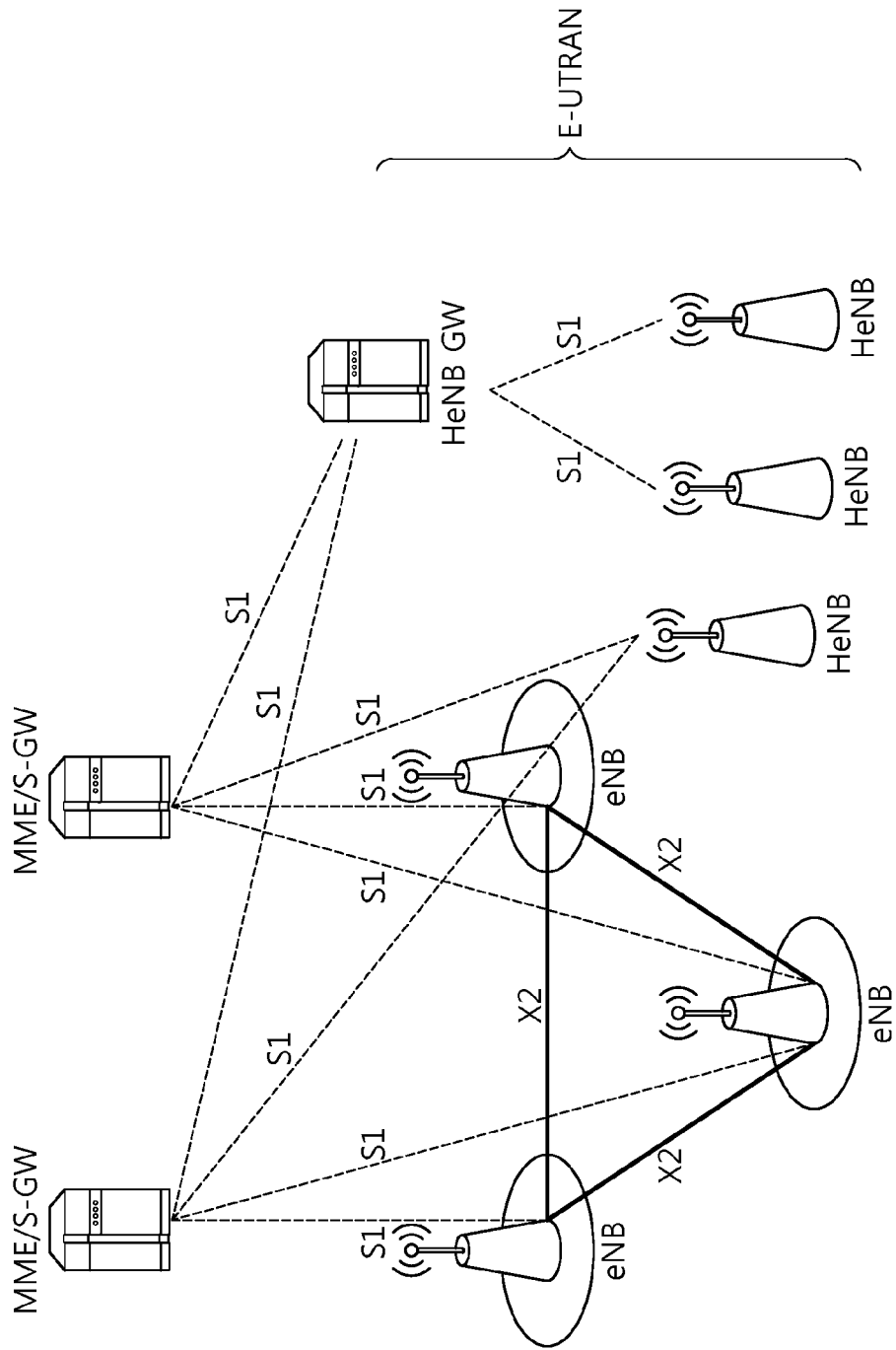
FIG. 11 shows an example of a wireless communication system for operating an HeNB.

FIG. 11 shows an example of a wireless communication system for operating an HeNB.

Referring to FIG. 11, a home eNB gateway (HeNB GW) can be operated to provide a service to the HeNB as described above. HeNBs are connected to an EPC directly or via the HeNB GW. An MME regards the HeNB GW as a typical eNB. Further, the HeNB regards the HeNB GW as the MME. Therefore, the HeNB and the HeNB GW are connected by means of an S1 interface, and also the HeNB GW and the EPC are connected by means of the S1 interface. Furthermore, even in a case where the HeNB and the EPC are directly connected, they are connected by means of the S1 interface. A function of the HeNB is almost similar to a function of the typical eNB.

In general, the HeNB has radio transmission output power lower than that of an eNB owned by a mobile network vendor. Therefore, in general, the coverage provided by the HeNB is smaller than the coverage provided by the eNB. Due to such characteristics, a cell provided by the HeNB is often classified as a femto cell in contrast to a macro cell provided by the eNB from the perspective of the coverage. Meanwhile, from the perspective of provided services, when the HeNB provides the services only to the CSG group, a cell provided by this HeNB is referred to as a CSG cell.

Each CSG has its own identity which is called a CSG identity (CSG ID). The UE may have a list of CSGs to which the UE belongs as a member thereof, and this CSG list may be referred as a CSG white list. The CSG white list may change by a request of the UE or by a command of the network. In general, one HeNB can support one CSG.

The HeNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell.

It is not always required for the HeNB to allow access of the CSG UE. Based on the configuration setting of the HeNB, access of a non-CSG member UE may also be allowed. According to the configuration setting of the HeNB, access is allowed for a different UE. Herein, the configuration setting denotes setting of an operation mode of the HeNB. The operation mode of the HeNB is classified into three modes described below, depending on a type of UE for which a service is provided.

1) Closed access mode: A mode in which services are provided to particular CSG members only. The HeNB provides a CSG cell.

2) Open access mode: A mode in which services are provided without any restriction of particular CSG members, similarly to the typical eNB. The HeNB provides a typical cell instead of a CSG cell.

3) Hybrid access mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HeNB notifies to the UE whether a cell serviced by the HeNB is a CSG cell or a typical cell, and thus allows the UE to know whether the UE can access to the cell. When operating in the closed access mode, the HeNB broadcasts that the cell serviced by the HeNB is the CSG cell by using system information. When operating in the open access mode, the HeNB broadcasts that the cell serviced by the HeNB is not the CSG cell by using the system information. In this manner, the HeNB inserts a CSG indicator into the system information, wherein the CSG indicator indicates whether the cell being serviced by the HeNB is the CSG cell or not. For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell provided by the eNB from the typical cell, the typical eNB may also transmit the CSG indicator so as to allow the UE to know that the cell type provided by the eNB is the typical cell. The typical eNB may allow the UE to know that the cell type provided by the eNB is the typical cell by not transmitting the CSG indicator. The CSG-related parameters transmitted by the corresponding cell for each cell type are represented in Table 2. Subsequently, a type of UE for which access is accepted is represented in Table 3.

TABLE 2

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

TABLE 3

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

From UE perspective, the list of CSGs to which the UE is considered CSG member should be managed. The list of CSGs is referred to as CSG white-list for the UE. Operator should also manage CSG subscription data of its subscribers.

The CSG subscription data of UEs are stored in Home Subscriber Server (HSS). The CSG subscription data is transferred to MME when UE registers with network. For a UE, the CSG subscription data is stored in Universal Subscriber Identity Module (USIM) of the UE.

Figure 12:
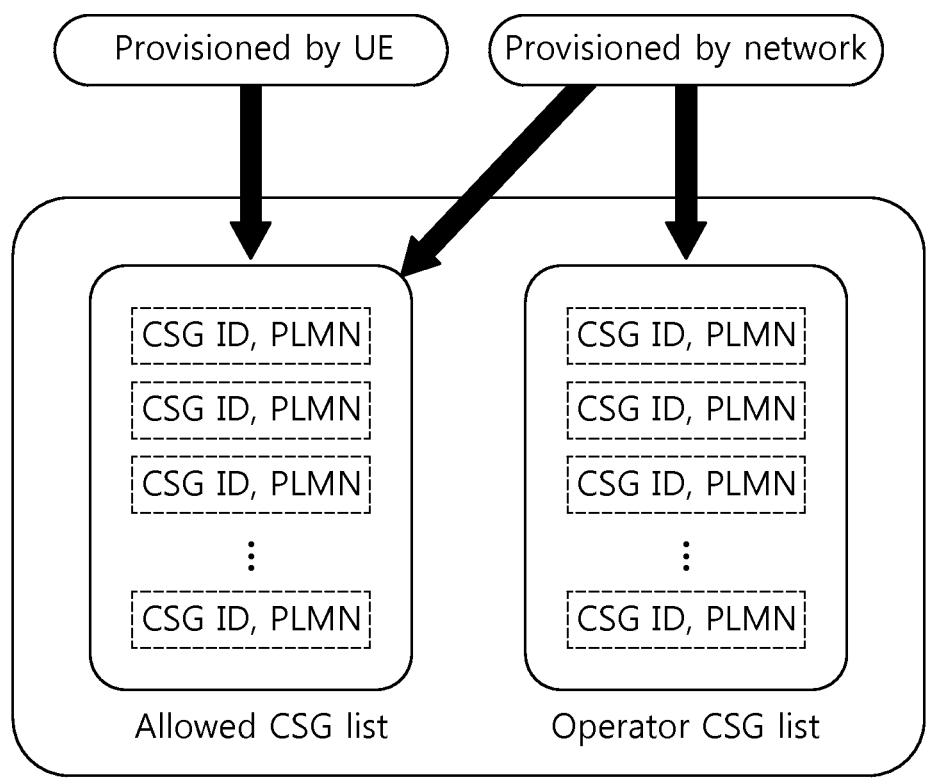
FIG. 12 illustrates an example of CSG white-list structure.

FIG. 12 illustrates an example of CSG white-list structure.

As shown in the FIG. 12, CSG white-list consists of 'Allowed CSG list' and 'Operator CSG list'. The Allowed CSG list can be provisioned by both UE and network, while the Operator CSG list is only provisioned by network. CSG provisioning can be carried out by Open Mobile Alliance Device Management (OMA DM) procedures or by Over-The-Air (OTA) technologies. NAS procedures are also used for CSG provisioning in case of manual CSG selection, where CSG white-list can be updated during e.g. attach or tracking area update procedure.

A cell reselection and a handover may be considered as procedures of performing mobility related to the CSG cell and performed by the UE. First, the cell reselection related to the CSG cell will be described.

The CSG cell is a cell for providing a CSG member UE with better service. Therefore, in case that UE is camping on the CSG cell, it is not desirable for a quality of service that the UE unconditionally reselects inter-frequency when the UE discovers the inter-frequency having a higher priority than the priority of a serving frequency.

In case that the UE camping on the CSG cell, for preventing the UE from unconditionally reselecting the higher priority inter-frequency than the serving frequency, a rank based cell reselection method is proposed. According to the rank based cell reselection, the UE assumes that a priority of the frequency of the CSG cell is higher than priorities of other frequency, if the CSG is confirmed as a best ranked cell based on a criterion of cell reselection evaluation. When the UE allocated the higher priority than a priority indicated by network to a specific frequency, the allocated priority is referred as an implicit highest priority.

According to the rank based cell reselection method, it is supported that the UE remains the CSG cell with satisfying a rule indicating cell reselection is preliminary based on the frequency priority. If the UE, camped on the CSG cell, reselects a non-CSG cell operating on the same frequency, the implicit highest priority for the corresponding frequency is withdrawn and performs the cell reselection method based on the frequency priority signaled by the network. In case that the UE detect a best ranked CSG cell operating on a frequency with the same frequency priority, it depends on a implementation of the UE that whether the UE reselects the CSG cell or remains the current CSG cell.

Next, a handover method related to a CSG cell will be described.

Figure 13:
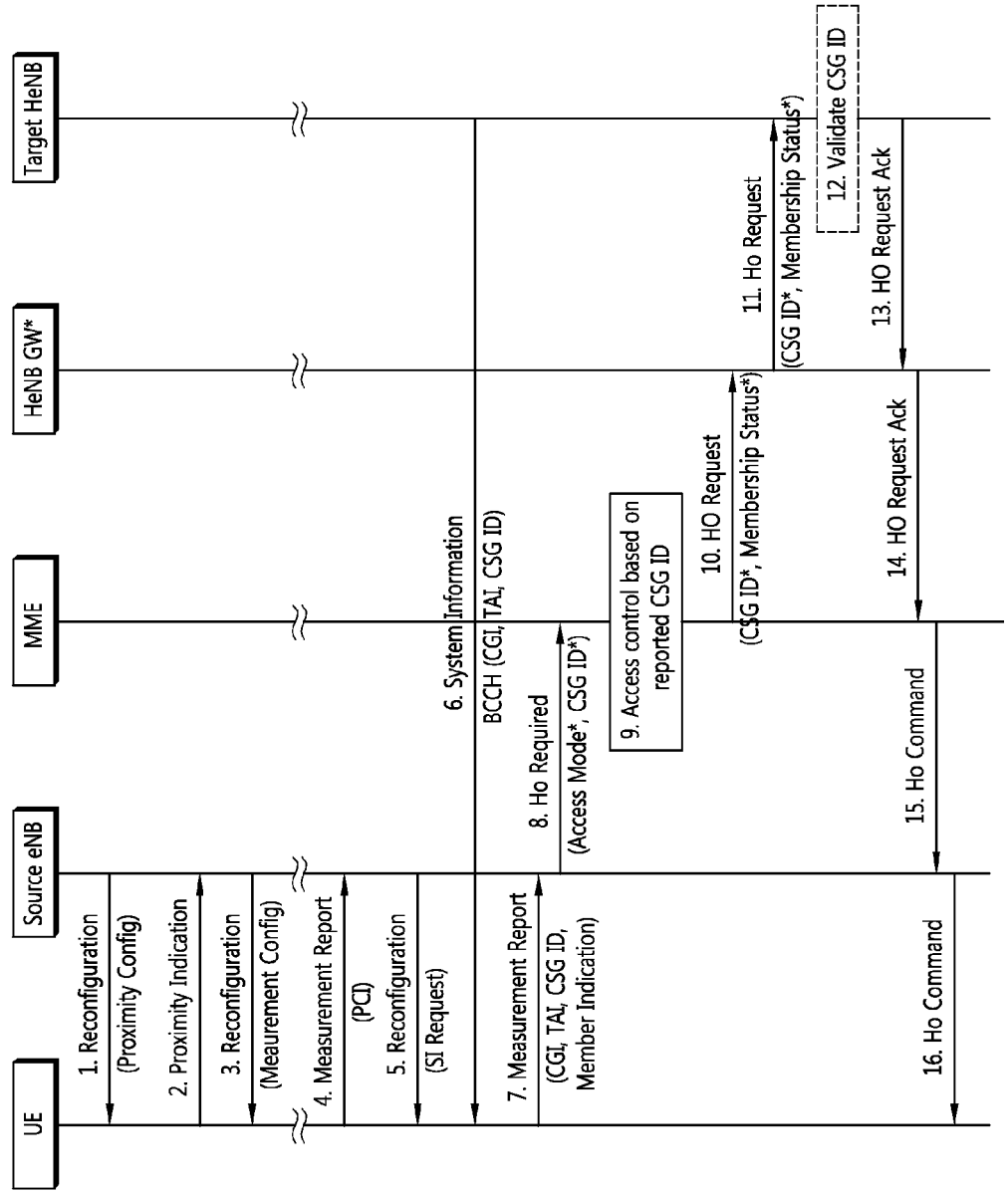
FIG. 13 is a flowchart showing a handover procedure for CSG cell.

FIG. 13 is a flowchart showing a handover procedure for CSG cell.

Referring to the FIG. 13, the handover procedure for the CSG cell follows:

Step.1 The source eNB configures the UE with proximity indication control. For this, the source eNB may transmit a reconfiguration message to the UE. The configuration message includes information for a configuration of the proximity indication.

Step.2 The UE sends an "entering" proximity indication when it determines it may be near a cell (based on autonomous search procedures) whose CSG ID is in the UE's CSG whitelist. The proximity indication includes the RAT and frequency of the cell.

Step.3 If a measurement configuration is not present for the concerned frequency/RAT the source eNB configures the UE with relevant measurement configuration including measurement gaps as needed, so that the UE can perform measurements on the reported RAT and frequency. For this, the source eNB transmit a reconfiguration message to the UE. The reconfiguration message may include information for a configuration of the measurement.

The network may also use the proximity indication to minimize the requesting of handover preparation information of CSG/hybrid cells by avoiding requesting such information when the UE is not in the geographical area where cells whose CSG IDs are in the UEs CSG White-list are located.

Step.4 The UE sends a measurement report including the PCI (e.g., due to triggered event A3).

Step.5 The source eNB configures the UE to perform system information acquisition and reporting of a particular PCI.

Step.6 The UE performs the system information acquisition using autonomous gaps, i.e., the UE may suspend reception and transmission with the source eNB within the limits defined in [TS 36.133] to acquire the relevant system information from the target HeNB.

Step.7 The UE sends a measurement report including (E-)CGI, TAI, CSG ID and "member/non-member" indication.

Step.8 The source eNB includes the target E-CGI and the CSG ID in the Handover Required message sent to the MME. If the target is a hybrid cell the Cell Access Mode of the target is included.

Step.9 The MME performs UE access control to the CSG cell based on the CSG ID received in the Handover Required message and the stored CSG subscription data for the UE. If the access control procedure fails, the MME ends the handover procedure by replying with the Handover Preparation Failure message. If the Cell Access Mode is present, the MME determines the CSG Membership Status of the UE handing over to the hybrid cell and includes it in the Handover Request message.

Steps.10-11 The MME sends the Handover Request message to the target HeNB including the target CSG ID received in the Handover Required message. If the target is a hybrid cell, the CSG Membership Status will be included in the Handover Request message.

Step.12 The target HeNB verifies that the CSG ID received in the Handover Request message matches the CSG ID broadcast in the target cell and if such validation is successful it allocates appropriate resources. UE prioritization may also be applied if the CSG Membership Status indicates that the UE is a member.

Steps.13-14 The target HeNB sends the Handover Request Acknowledge (ACK) message to the MME via the HeNB GW if present.

Step.15 The MME sends the Handover Command message to the source eNB.

Step.16 The source eNB transmits the Handover Command (RRC Connection Reconfiguration message including mobility control information) to the UE.

The above Steps 1-9, 15 and 16 may also be applied to inter-RAT mobility from LTE to HNB.

After sending an "entering" proximity indication (step 2), if the UE determines that it is no longer near a cell whose CSG ID is in the UE's CSG whitelist, the UE sends a "leaving" proximity indication to the source eNB. Upon reception of this indication, the source eNB may reconfigure the UE to stop measurements on the reported RAT and frequency.

In the above procedure, steps 2 and 3 may not be performed in case the UE has not previously visited the HeNB, e.g., when the UE first visits a hybrid cell.

The PCI confusion is resolved by steps 5, 6 and 7. The source eNB can request the system information acquisition and reporting for any PCI, not limited to PSCs/PCIs of CSG or hybrid cells.

In general, a CSG cell and a macro cell may be simultaneously operated on same frequency. A frequency on which only CSG cell operates is referred as a CSG dedicated frequency. Otherwise, a specific frequency on which the CSG cell and the macro cell simultaneously operate is referred as a mixed carrier frequency. On the mixed carrier frequency, a physical layer cell identity may be reserved for the CSG cell by the network. The physical layer cell identity is referred as Physical Cell Identity (PCI) in the E-UTRAN system and referred as a Physical scrambling code (PSC) in the UTRAN. For a convenience, the physical layer identity is referred as the PCI.

The CSG cell announces the PCI reserved for CSG on the current frequency through system information. The UE receiving the information may determine whether a cell is CSG cell or non-CSG cell when the UE detects the cell. It will be described how the UE uses the information through cases of two UE types.

First, in case that the UE does not support a function related to the CSG and/or does not have a CSG list of which the UE is a member, the UE may not consider the cell as a possible cell for selection in the cell selection/reselection/handover procedure. In this case, the UE confirms only the PCI of the cell and may exclude the cell in the cell selection/reselection/handover procedure, if the PCI of the cell is a PCI reserved for CSG. In general, a PCI of a cell is known in step where the UE detects a presence of the cell through a physical layer.

Second, in case that the UE has the CSG list of which the UE is a member, when the UE needs to know a list cell about neighbor CSG cell on the mixed carrier frequency, the UE can know that the cell is a CSG cell by discovering the cell having a PCI reserved for the CSG cell, instead of checking CSG identities in system information of all cells discovered in a total PCI range.

Information related to a set of PCIs reserved for CSG cell on a predetermined frequency may be referred as CSG PCI split information. The CSG PCI split information may indicates a range of PCIs reserved for CSG cell. The CSG PCI split information may be availably applied if less than 24 hours has elapsed since it was received and the UE is camping on a cell of the same primary PLMN (rPLMN) where the information is received.

Like the CSG PCI split information, PCI information reserved for a predetermined type cell may be referred as PCI split information. That is, the PCI split information may be implemented as a set of PCIs allocated to predetermined type cell. If the predetermined type cell related to the PCI split information allows a certain type UE to access, a UE may firstly determine whether a corresponding cell is accessible by comparing the PCI split information and a PCI of the cell. In the following, a communication system, in which a CSG cell presents and to which the CSG split information is applied, is illustrated for describing a method of performing mobility based on the PCI split information. However, it is clear that a scope of the present invention is not limited in the communication system.

Predetermined PCI split information may be only available in a specific area. In this case, an area where the PCI split information is available may be referred as a coordinated area, and another area where the PCI split information is no available may be referred as an uncoordinated area.

If the PCI split information is the CSG PCI information indicating a set of PCIs reserved for CSG cells, the coordinated area and the uncoordinated may be respectively referred as a CSG coordinated area and a CSG uncoordinated area.

Meanwhile, in a method for performing mobility based on the CSG PCI split information, availability of the CSG PCI split information would be discussed. This will be described with referring the attached FIG. 14.

Figure 14:
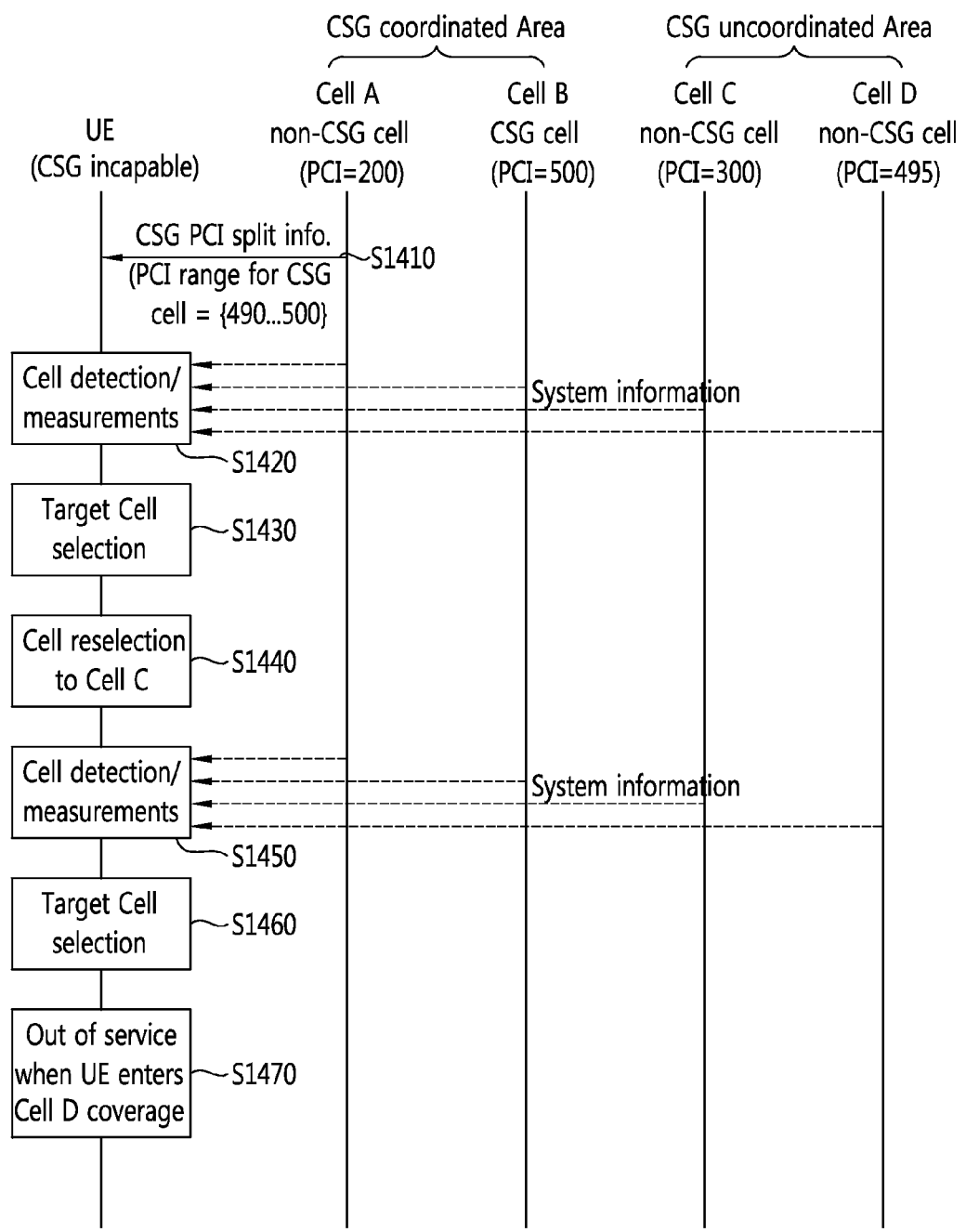
FIG. 14 is a diagram showing a problem may be occurred when the method of performing mobility based on the PCI split information is performed.

FIG. 14 is a diagram showing a problem may be occurred when the method of performing mobility based on the PCI split information is performed. In the example, a UE may be a CSG incapable UE, which is a cell not supporting UE or having a CSG white list of an empty state.

A Cell A, which is a non-CSG cell, and a Cell B, which is a CSG cell, may present in the CSG coordinated area. It is assumed that A PCI of the Cell A is 200 and a PCI of the Cell B is 500.

A cell C and a Cell D, which are non-CSG cells, may present in the CSG uncoordinated area. It is assumed that a PCI of the Cell C is 300 and a PCI of the Cell D is 495.

It is assumed that the UE moves in a direction where the UE is going far away from the Cell A and approaching the Cell D. Quality of a radio signal is variable in basis of a movement of the UE. It is assumed that the quality of the radio signal becomes better as the UE gets closer to the cell, and that the quality becomes worse as the UE goes farther away from the cell.

Referring to FIG. 14, the UE receives CSG PCI split information from the Cell A (step S1410). The CSG PCI split information may be transmitted in system information broadcasted by the Cell A. In this embodiment, the CSG PCI split information indicates a set of PCIs reserved for CSG cells, and it is assumed that the set of PCIs is implemented as range of PCI 490 to PCI 500.

The UE may be located in coverage of Cell A, coverage of Cell B, or a boundary of between the coverage of Cell A and the coverage of Cell B during move. This means that the UE is located in a CSG coordinated area and that the CSG PCI split information is available.

The UE detects a cell and measures the cell based on an already acquired measurement configuration (step S1420). In this embodiment, the cell detection by the UE may include receiving system information from the Cell A, B, C, and D and checking PCIs of the cells.

The UE selects a target cell based on the PCIs of the cells and the CSG split information (step S1430). The UE performs the cell selection/reselection evaluation based on a measurement result, the PCIs of the cells, and the CSG PCI split information, and then selects the target cell. PCIs of the Cell B and Cell D are included in the CSG PCI range indicated by the CSG PCI split information. Therefore, the UE excludes the Cell B and Cell C, performs a cell selection/reselection evaluation, and selects the target cell. When the UE determined that the Cell C satisfying a cell selection/reselection condition, the UE may select the Cell C as the target cell.

The UE performs the cell reselection to the Cell C (step S1440).

The UE may enter in the CSG uncoordinated area during the move. This means that the CSG PCI split information is not available any more. Meanwhile, the UE may not recognize that the UE is located in the CSG uncoordinated area. Therefore, the UE may operate based on the conventional CSG PCI split information in the CSG uncoordinated area.

The UE detects surrounding cells and measures the cells based on an already acquired measurement configuration (step S1450). In this example, the cell detection by the UE may include receiving system information from the Cell A, B, C, and, D, and checking PCIs of the cells.

The UE selects a target cell based on cell quality and the CSG PCI split information (step S1460). The UE performs a cell selection/reselection evaluation based on PCIs of the cells and the CSG PCI split information, and selects the target cell. Like the step S1430, the UE may exclude the Cell B and D for the cell selection/reselection, performs the cell selection/reselection, and selects the target cell. When the Cell C satisfies a cell selection/reselection condition, the UE selects the Cell C as the target cell.

In spite of leaving from coverage of the Cell C and entering to coverage of the Cell D, if the UE excludes the Cell D and performs the cell selection/reselection, the UE may select the Cell C having bad signal quality as the target cell, or keep trying access to the Cell C. This make the UE be out of service.

As above, if the CSG PCI split information is always applied to method for performing mobility (i.e. the cell selection/reselection) regardless of an availability of the CSG PCI split information, it is cannot be ensured that the UE access to a proper cell and a quality of wireless communication service may be deteriorate.

By considering the above possible problem, it is needed to propose a method for performing mobility by variably applying the CSG PCI split information in accordance with availability of the information.

The network may signal to the UE about the availability of the CSG PCI split information. It is assumed that the network is already aware of an arrangement of BSs and the network is aware of a status where the CSG coordinated area and the CSG uncoordinated are implemented based on the arrangement. Furthermore, it is assumed that, if needed, the network can make a certain BS signal to the UE that the conventional CSG PCI split information is not available any more. In this case, the BS indicating that the conventional CSG PCI split information is not available anymore may be a BS located in a boundary of between the CSG coordinated area and the CSG uncoordinated area.

Hereinafter, a method for performing mobility based on the CSG PCI split invalidation indication by referring figures.

Figure 15:
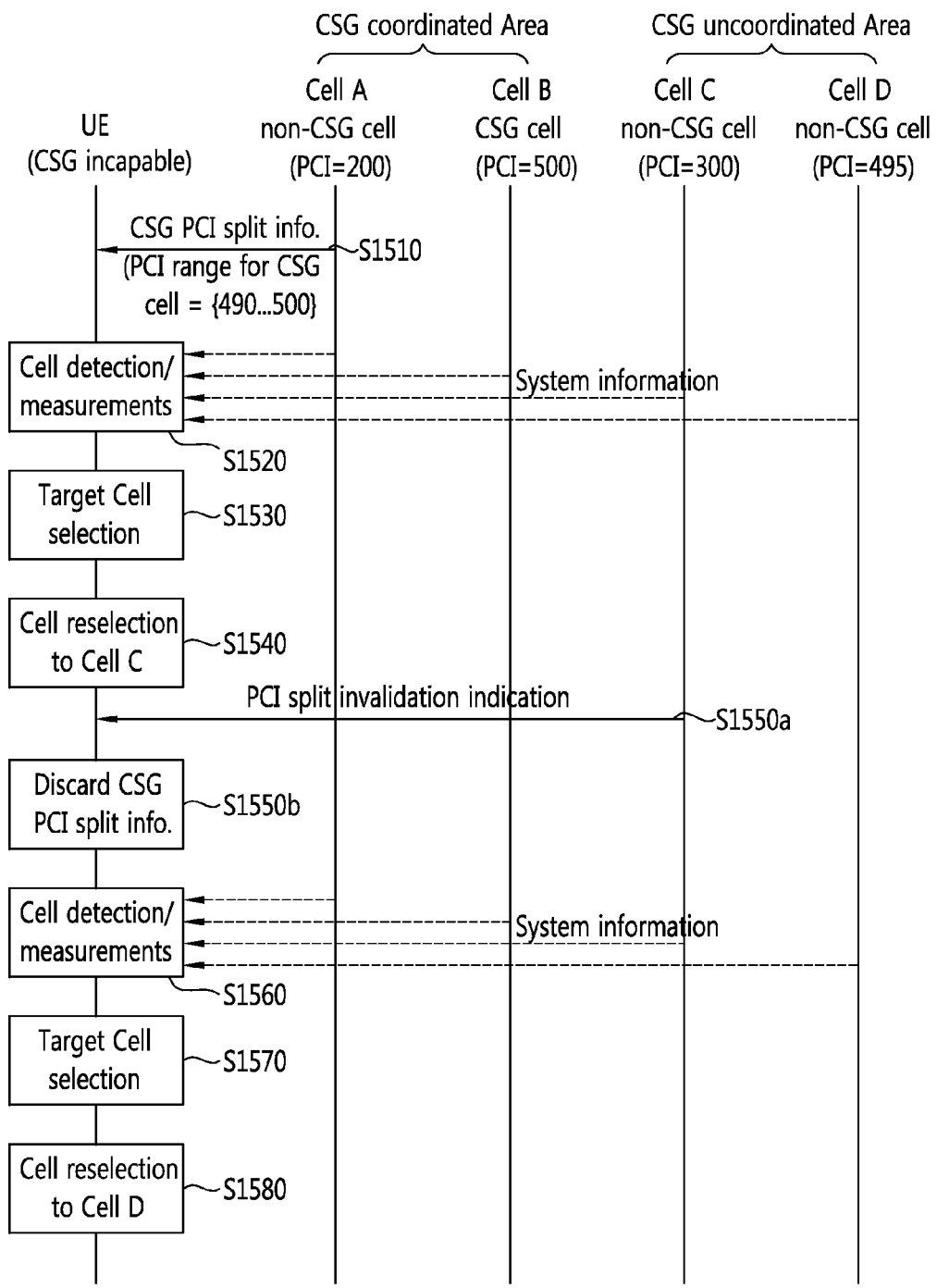
FIG. 15 is a diagram showing a method for performing mobility according to an embodiment of the present invention.

FIG. 15 is a diagram showing a method for performing mobility according to an embodiment of the present invention.

In this embodiment, a UE may be a CSG incapable UE, which is a cell not supporting UE or having a CSG white list of an empty state.

A Cell A, which is a non-CSG cell, and a Cell B, which is a CSG cell, may present in the CSG coordinated area. It is assumed that A PCI of the Cell A is 200 and a PCI of the Cell B is 500.

A cell C and a Cell D, which are non-CSG cells, may present in the CSG uncoordinated area. It is assumed that a PCI of the Cell C is 300 and a PCI of the Cell D is 495.

It is assumed that the UE moves in a direction where the UE is going far away from the Cell A and approaching the Cell D. Quality of a radio signal is variable in basis of a movement of the UE. It is assumed that the quality of the radio signal becomes better as the UE gets closer to the cell, and that the quality becomes worse as the UE goes farther away from the cell.

Referring to FIG. 15, the UE receives CSG PCI split information from the Cell A (step S1510). The CSG PCI split information may be transmitted in system information broadcasted by the Cell A. In this embodiment, the CSG PCI split information indicates a set of PCIs reserved for CSG cells, and it is assumed that the set of PCIs is implemented as range of PCI 490 to PCI 500.

The UE may be located in coverage of Cell A, coverage of Cell B, or a boundary of between the coverage of the Cell A and the coverage of the Cell B during move. This means that the UE is located in a CSG coordinated area and that the CSG PCI split information is available.

The UE detects a cell and measures the cell based on an already acquired measurement configuration (step S1520). In this embodiment, the cell detection by the UE may include receiving system information from the Cell A, B, C, and D and checking PCIs of the cells.

The UE selects a target cell based on the PCIs of the cells and the CSG split information (step S1530). The UE performs the cell selection/reselection evaluation based on a measurement result, the PCIs of the cells, and the CSG PCI split information, and then selects the target cell. PCIs of the Cell B and Cell D are included in the CSG PCI range indicated by the CSG PCI split information. Therefore, the UE excludes the Cell B and Cell D, performs a cell selection/reselection evaluation, and selects the target cell. When the UE determined that the Cell C satisfying a cell selection/reselection condition, the UE may select the Cell C as the target cell.

The UE performs the cell reselection to the Cell C (step S1540).

The UE may enter in the CSG coordinated area during the move. This means that the CSG PCI split information is not available any more. Therefore, the Network may signal to the UE that the conventional CSG PCI split information is not available any more. The network may transmit a CSG PCI split invalidation indication to the UE (step S1550a). The CSG PCI split invalidation indication is transmitted to the UE by a cell which is located at a boundary of between the coverage of the CSG coordinated area and the CSG uncoordinated area. In this embodiment, the Cell C is located at the boundary of the CSG coordinated area and the CSG uncoordinated area, so that the Cell C may transmit the CSG PCI split invalidation indication to the UE.

The CSG PCI split invalidation indication may be broadcasted in system information of the corresponding cell. The CSG PCI split invalidation indication is transmitted by a dedicated signaling by a cell.

The CSG PCI split invalidation indication may be implemented in PCI split information set as a predetermined value. The predetermined value may be a value indicating that there is no set of PCIs reserved for the CSG cell. That is, the predetermined value may indicate that the PCI range is empty.

Apart from the CSG PCI split information, the CSG PCI split invalidation indication may be implemented as indicating information. In this case, the CSG PCI split invalidation indication is configured to indicates whether the conventional CSG PCI split information is available or not The UE receiving the CSG PCI split invalidation indication discards the conventional CSG PCI split information (step S1550b). Through the forementioned procedure, the UE may perform the cell selection/reselection by not applying the CSG PCI split information.

The UE detects surrounding cells and measures the cells based on an already acquired measurement configuration (step S1560). In this example, the cell detection by the UE may include receiving system information from the Cell A, B, C, and, D, and checking PCIs of the cells.

The UE selects a target cell based on cell quality and the PCIs of the cells (step S1570). The UE performs a cell selection/reselection evaluation based on a measurement result and PCIs of the cells, and selects the target cell. The UE performs the cell selection/reselection evaluation, and select a cell satisfying the cell selection/reselection condition as the target cell. In case that the UE has entered in coverage of the Cell D and a quality of the Cell D is good, the UE may select the Cell D as the target cell.

The UE performs the cell reselection to the Cell D (step S1580).

According to the example of FIG. 15, the UE performs the cell selection/reselection by not applying the CSG PCI split information which is not available any more in the CSG uncoordinated area. Through the forementioned procedure, the problem that the UE exclude the Cell D for the cell selection/reselection evaluation by improper application of the information may not be occurred. Therefore, the cell selection/reselection to a better cell is ensured for the UE.

Meanwhile, in case of receiving the CSG PCI split invalidation indication, the UE may not delete/discard the CSG PCI split information, but maintain the information and not apply the information. When the UE enters in the CSG coordinated area again, the UE may apply the conventional CSG PCI split information by itself and/or by an additional signaling of the network.

Meanwhile, regardless of the CSG PCI split invalidation indication, information about availability of the CSG PCI split information may be transmitted with the CSG PCI split information. Hereinafter, the information about the availability of the CSG PCI split information may be referred as CSG PCI split application area information. Hereinafter, a method for performing mobility with additionally transmitting the CSG PCI split application information will be described.

Figure 16:
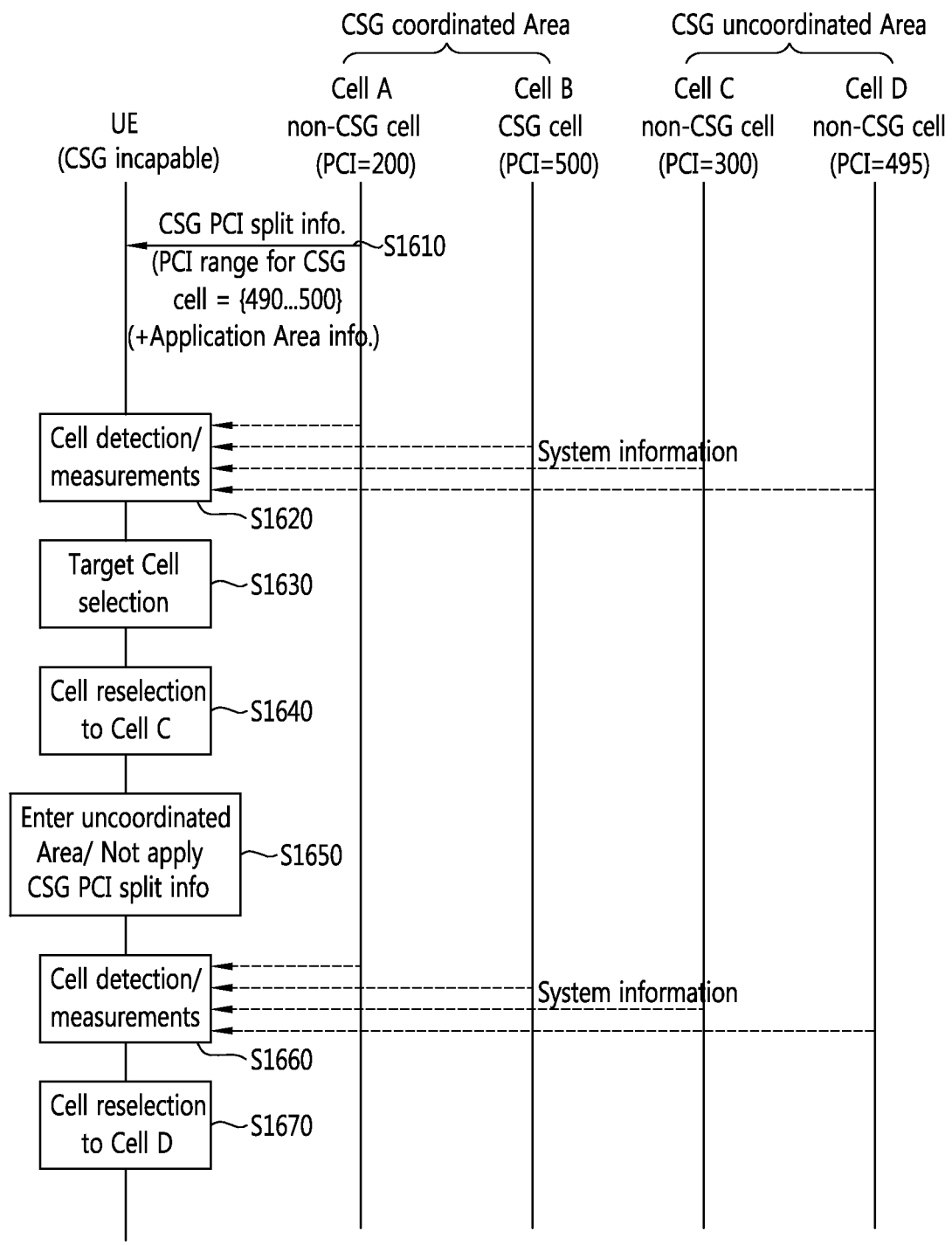
FIG. 16 is a diagram showing a method for performing mobility according to another embodiment of the present invention.

FIG. 16 is a diagram showing a method for performing mobility according to another embodiment of the present invention.

In this embodiment, a UE may be a CSG incapable UE, which is a cell not supporting UE or having a CSG white list of an empty state.

A Cell A, which is a non-CSG cell, and a Cell B, which is a CSG cell, may present in the CSG coordinated area. It is assumed that A PCI of the Cell A is 200 and a PCI of the Cell B is 500.

A cell C and a Cell D, which are non-CSG cells, may present in the CSG uncoordinated area. It is assumed that a PCI of the Cell C is 300 and a PCI of the Cell D is 495.

It is assumed that the UE moves in a direction where the UE is going far away from the Cell A and approaching the Cell D. Quality of a radio signal is variable in basis of a movement of the UE. It is assumed that the quality of the radio signal becomes better as the UE gets closer to the cell, and that the quality becomes worse as the UE goes farther away from the cell.

Referring to FIG. 16, the UE receives CSG PCI split information and CSG PCI split application area information from the Cell A (step S1610).

The CSG PCI split application area information may indicate a cell list to which the corresponding CSG PCI split information is applied. In this case, the UE applies the conventional CSG PCI split information when the UE is camping on a cell included in the cell list.

The CSG PCI split application area information may indicate a tracking area list to which the corresponding CSG PCI split information is applied. The UE applies the conventional CSG PCI split information when the UE is camping on a cell included in the tracking area list.

The CSG split application area information may indicate a geographical area in which the corresponding CSG PCI split information is applied. The UE applies the conventional CSG split information when the UE is located in the geographical area.

The CSG PCI split application area information is PLMN related information regarding availability of the corresponding CSG PCI split information. As mentioned above, the availability of the PCI split information is maintained if pPLMN of a cell where the corresponding information is acquired is identical to pPLMN of a cell where the UE is located. Meanwhile, by expanding the forementioned condition, the CSG PCI split application area information may indicate a PLMN list about PLMNs where the CSG PCI split information is available. In this case, the UE applies the conventional CSG PCI split information when rPLMN of the UE and/or selected PLMN are included in the PLMN list.

The UE may be located in coverage of Cell A, coverage of Cell B, or a boundary of between the coverage of the Cell A and the coverage of the Cell B during move. The UE may determine whether the CSG split information can be applied, that is, whether the UE is located in the CSG coordinated area based on the CSG PCI split application area information.

The UE detects a cell and measures the cell based on an already acquired measurement configuration (step S1620). In this embodiment, the cell detection by the UE may include receiving system information from the Cell A, B, C, and D and checking PCIs of the cells.

The UE selects a target cell based on the PCIs of the cells and the CSG split information (step S1630). The UE performs the cell selection/reselection evaluation based on a measurement result, the PCIs of the cells, and the CSG PCI split information, and then selects the target cell. PCIs of the Cell B and Cell D are included in the CSG PCI range indicated by the CSG PCI split information. Therefore, the UE excludes the Cell B and Cell D, performs a cell selection/reselection evaluation, and selects the target cell. When the UE determined that the Cell C satisfying a cell selection/reselection condition, the UE may select the Cell C as the target cell.

The UE performs the cell reselection to the Cell C (step S1640).

The UE may determine that the UE is located in the CSG uncoordinated area in basis of the CSG PCI split application area information. In this case, the UE may not apply the conventional CSG PCI split information (step S1650).

The UE detects surrounding cells and measures the cells based on an already acquired measurement configuration (step S1660). In this example, the cell detection by the UE may include receiving system information from the Cell A, B, C, and, D, and checking PCIs of the cells.

The UE selects a target cell based on cell quality and the PCIs of the cells (step S1670). The UE performs a cell selection/reselection evaluation based on a measurement result and PCIs of the cells, and selects the target cell. The UE performs the cell selection/reselection evaluation, and select a cell satisfying the cell selection/reselection condition as the target cell. In case that the UE has entered in coverage of the Cell D and a quality of the Cell D is good, the UE may select the Cell D as the target cell.

The UE performs the cell reselection to the Cell D (step S1680).

In the embodiment of the FIG. 16, the UE judges the availability of the conventional CSG PCI split information, and then determine whether to apply the information. Therefore, the UE autonomously determines that the UE enters in the CSG uncoordinated area, and then performs mobility according to the determination.

Meanwhile, the CSG PCI split invalidation indication proposed in the embodiment of FIG. 15 may be provided with the CSG PCI split application area information proposed in the embodiment of FIG. 16. In that case, the UE determines whether the CSG PCI split information is available in basis of the CSG PCI split application area information. However, if the UE receives the CSG PCI split invalidation indication from the network, the UE may not apply the conventional CSG PCI split information, and further discard the conventional CSG PCI split information. That is, when the CSG PCI split invalidation indication is provided with the CSG PCI split application area information, the CSG split invalidation is preferentially considered for controlling an operation of the UE.

Meanwhile, it is clear that the embodiments described in FIGS. 16 and 16 may be applied to not only a communication system based on the LTE, but also a communication system based on the UMTS. In case of the UMTS, the PCI as a cell identity is replaced with the PSC.

Figure 17:
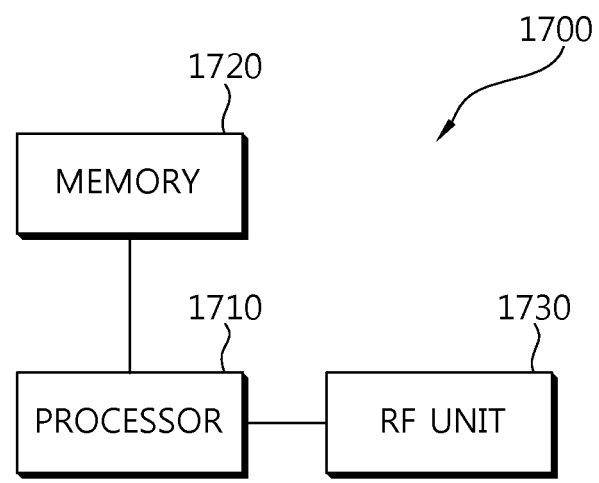
FIG. 17 is a block diagram showing a wireless apparatus according to an embodiment of the present invention.

FIG. 17 is a block diagram showing a wireless apparatus according to an embodiment of the present invention. The apparatus implements an operation of a UE according to the embodiments of FIG. 15 to FIG. 16.

A wireless apparatus 1700 includes a processor 1710, a memory 1720, and a radio frequency (RF) unit 1730. The processor 1710 implements the proposed functions, procedures, and/or methods. The processor 1710 may be configured to receive PCI split information and determine a target cell for cell selection/reselection based on the information. The processor (1710) is configured to not apply the PCI split information to the cell selection/reselection procedure if the PCI split invalidation is received. The processor (1710) is configured to receive the PCI split application area information and determine whether to apply the PCI split information based on the PCI split application area information. The embodiments of FIG. 15 and FIG. 16 and a combination of the embodiments can be implemented by the processor 1710 and the memory 1720.

The RF unit 1730 coupled to the processor 1910 transmits and receives a radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

A user equipment determine whether PCI split information, which indicates a PCI set reserved for a predetermined type cell, is available. Therefore, the user equipment may perform mobility such as a cell selection/reselection based on the PCI split information, when the information is available. This feature may prevent the user equipment from applying the PCI split information, when the user equipment is located in an area in which the PCI split information is not available. According to embodiments of the present invention, the user equipment can effectively perform mobility so that a service provided to the user equipment is improved.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for performing mobility by a user equipment (UE) in a wireless communication system, the method comprising:
   receiving Physical layer Cell Identity (PCI) split information from a network, the PCI split information indicating a predetermined set of at least one PCI reserved for a predetermined cell type;
   receiving system information from at least one candidate cell, the system information comprising a PCI for each cell;
   measuring the at least one candidate cell;
   determining whether to apply the PCI split information for selecting a target cell;
   selecting the target cell; and
   performing the mobility to the target cell;
   wherein if it is determined that the PCI split information is applied, the step of selecting the target cell comprises:
   excluding at least one cell has a PCI included in the predetermined set; and
   selecting the target cell among at least one remaining cell.

2. The method of claim 1, wherein if is determined that the PCI split information is not applied, the step of selecting the target cell comprises:
   selecting the target cell among the at least one candidate cell.

3. The method of claim 1, further comprising:
receiving a PCI split invalidation indication from the network, the PCI invalidation indication indicating the PCI split information is not available,
wherein the step of determining whether to apply the PCI split information comprises:
determining not to apply the PCI split information in response to the PCI split invalidation indication.

4. The method of claim 3, further comprising:
discarding the PCI split information in response to the PCI split invalidation indication.

5. The method of claim 1, further comprising:
receiving a PCI split application area information from the network; and
determining whether the PCI split information is available based on the PCI split application area information, and
wherein it is determined that the PCI split information is applied if the PCI split information is available.

6. The method of claim 5, wherein the PCI split application area information indicates a cell list indicating at least one cell in which the PCI split information is available, and
wherein it is determined that the PCI split information is available if the UE camps on the at least one cell indicated by the cell list.

7. The method of claim 5, wherein the PCI split application area information indicates a tracking area, and
wherein it is determined that the PCI split information is available if the UE camps on a cell included in the tracking area.

8. The method of claim 5, wherein the PCI split application area information indicates a geographical area, and
wherein it is determined that the PCI split information is available if the UE is located in the geographical area.

9. The method of claim 5, wherein the PCI split application area information indicates a public land mobile network (PLMN) list, and
wherein it is determined that the PCI split information is available if a registered PLMN (RPLMN) is included in the PLMN list.

10. The method of claim 1, wherein the predetermined cell type is a Closed Subscriber Group (CSG) cell type.

11. An apparatus operating in a wireless communication system, the apparatus comprising:
a radio frequency (RF) unit transmitting and receiving a radio signal; and,
a processor operably coupled to the RF unit, wherein the processor is configured to:
receive Physical layer Cell Identity (PCI) split information from a network, the PCI split information indicating a predetermined set of at least one PCI reserved for a predetermined cell type,
receive system information from at least one candidate cell, the system information comprising a PCI for each cell,
measure the at least one candidate cell,
determine whether to apply the PCI split information for selecting a target cell,
select the target cell, and
perform the mobility to the target cell,
wherein if it is determined that the PCI split information is applied, the selecting the target cell comprises:
excluding at least one cell has a PCI included in the predetermined set; and
selecting the target cell among at least one remaining cell.

12. The apparatus of claim 11, wherein if is determined that the PCI split information is not applied, the selecting the target cell comprises:
selecting the target cell among the at least one candidate cell.

13. The apparatus of claim 11, the processor is configured to:
receive a PCI split invalidation indication from the network, the PCI invalidation indication indicating the PCI split information is not available,
wherein the determining whether to apply the PCI split information comprises:
determining not to apply the PCI split information in response to the PCI split invalidation indication.

14. The apparatus of claim 13, the processor is configured to:
discard the PCI split information in response to the PCI split invalidation indication.

15. The apparatus of claim 11, the processor is configured to:
receive a PCI split application area information from the network; and
determine whether the PCI split information is available based on the PCI split application area information, and
wherein it is determined that the PCI split information is applied if the PCI split information is available.

16. The apparatus of claim 15, wherein the PCI split application area information indicates a cell list indicating at least one cell in which the PCI split information is available, and
wherein it is determined that the PCI split information is available if the apparatus camps on the at least one cell indicated by the cell list.

17. The apparatus of claim 15, wherein the PCI split application area information indicates a tracking area, and
wherein it is determined that the PCI split information is available if the apparatus camps on a cell included in the tracking area.

18. The apparatus of claim 15, wherein the PCI split application area information indicates a geographical area, and
wherein it is determined that the PCI split information is available if the apparatus is located in the geographical area.

19. The apparatus of claim 15, wherein the PCI split application area information indicates a public land mobile network (PLMN) list, and
wherein it is determined that the PCI split information is available if a registered PLMN (RPLMN) is included in the PLMN list.

20. The apparatus of claim 11, wherein the predetermined cell type is a Closed Subscriber Group (CSG) cell type.

* * * * *